(12) United States Patent
Sainsbury (10) Patent No.: US 9,413,805 B2
(45) Date of Patent: Aug. 9, 2016

(54) GEOLOCATION ENGINE

(71) Applicant: GeoComply Global Inc., Vancouver (CA)

(72) Inventor: Anna Sainsbury, Manila (PH)

(73) Assignee: GeoComply Global Inc., Vancouver BC (CA)

(*) Notice: Subject to any disclaimer, the term of this patent is extended or adjusted under 35 U.S.C. 154(b) by 386 days.

(21) Appl. No.: 13/715,672

(22) Filed: Dec. 14, 2012

(65) Prior Publication Data

US 2013/0179544 A1 Jul. 11, 2013

Related U.S. Application Data

(63) Continuation-in-part of application No. 13/705,123, filed on Dec. 4, 2012.

(60) Provisional application No. 61/576,279, filed on Dec. 15, 2011.

(51) Int. Cl.
*G06F 15/173* (2006.01)
*H04L 29/08* (2006.01)
*H04W 4/02* (2009.01)

(52) U.S. Cl.
CPC ............... *H04L 67/02* (2013.01); *H04L 67/18* (2013.01); *H04L 67/34* (2013.01); *H04W 4/021* (2013.01)

(58) Field of Classification Search
CPC .................................................... H04W 4/021
USPC ........................................................ 709/219
See application file for complete search history.

(56) References Cited

U.S. PATENT DOCUMENTS

| 7,471,245 B2* | 12/2008 | Chung ................. G01S 5/0252 342/451 |
| 9,038,158 B1* | 5/2015 | MacKay ............... H04L 63/107 709/225 |
| 2003/0074471 A1* | 4/2003 | Anderson ......... H04L 29/12009 709/245 |
| 2006/0125695 A1* | 6/2006 | Kennedy et al. .............. 342/465 |
| 2008/0028389 A1* | 1/2008 | Genty et al. .................. 717/174 |
| 2008/0180325 A1* | 7/2008 | Chung et al. .................. 342/451 |
| 2008/0311893 A1* | 12/2008 | Liu .................... G06Q 20/3224 455/414.2 |
| 2009/0144411 A1* | 6/2009 | Winkler et al. ............... 709/224 |
| 2010/0169479 A1* | 7/2010 | Jeong ................. H04L 63/1416 709/224 |
| 2010/0203972 A1* | 8/2010 | Lee ......................... A63F 13/12 463/42 |
| 2010/0330961 A1* | 12/2010 | Rogel .................... G06F 21/31 455/411 |

(Continued)

*Primary Examiner* — Hamza Algibhah
(74) *Attorney, Agent, or Firm* — Polsinelli LLP (57) ABSTRACT

Embodiments of the present invention for determining a geolocation for a device in communication with a network service provider begin with installing a mechanism for collecting geolocation data at a client device. The mechanism may be implemented as a mobile app, client application, browser plug-in, or other mechanism. The mechanism may collect geolocation data from multiple sources, including the device itself and other devices within the vicinity. The mechanism may also collect data regarding selected programs that may be installed on the client device. The geolocation data and program data may be transmitted back to a server for processing. The server may determine whether a geolocation is acceptable by determining a geolocation from the geolocation data, a likelihood of accuracy and/or trust score, as well as determining if any undesirable programs are stored on the client device. A determination regarding the geolocation of the client device if made, a white list of devices may be updated, and the geolocation results are provided the network service provider, either directly by the server or through the mechanism on the client device.

10 Claims, 7 Drawing Sheets

(56) References Cited

U.S. PATENT DOCUMENTS

| | | | |
|---|---|---|---|
| 2011/0028220 A1* | 2/2011 | Reiche, III | A63F 13/12 436/42 |
| 2011/0307354 A1* | 12/2011 | Erman | G06F 8/60 705/27.1 |
| 2011/0320307 A1* | 12/2011 | Mehta | G06Q 30/0282 705/26.7 |
| 2012/0123806 A1* | 5/2012 | Schumann et al. | 705/4 |
| 2012/0244945 A1* | 9/2012 | Kolo | A63F 13/12 463/42 |
| 2013/0045729 A1* | 2/2013 | Haik et al. | 455/418 |
| 2013/0205196 A1* | 8/2013 | Han et al. | 715/234 |

* cited by examiner

GEOLOCATION ENGINE

BACKGROUND OF THE INVENTION

Legislation and other commercial rationales require gaming Providers to be able to demonstrate a secure method of geo-locating an end user before they can transact with the Provider. For example online gaming on PCs, Macs and/or mobile devices with a locally licensed Provider or the selling of sports or other media rights split by geographical jurisdiction.

There is a need in the art for providing a secure method of geo-locating an end user for network gaming services.

SUMMARY OF THE CLAIMED INVENTION

The geolocation engine of the present invention is a highly secure and versatile service that allows providers, such as a provider of network gaming services, to securely and reliably determine user or player location, often to within a few meters of accuracy.

Embodiments of the present invention for determining a geo-location for a device in communication with a network service provider begin with installing a mechanism for collecting geolocation data at a client device. The mechanism may be implemented as a mobile app, client application, browser plug-in, or other mechanism. The mechanism may collect geolocation data from multiple sources, including the device itself and other devices within the vicinity. The mechanism may also collect data regarding selected programs that may be installed on the client device. The geolocation data and program data may be transmitted back to a server for processing. The server may determine whether a geolocation is acceptable by determining a geolocation from the geolocation data, a likelihood of accuracy and/or trust score, as well as determining if any undesirable programs are stored on the client device. A determination regarding the geolocation of the client device if made, a white list of devices may be updated, and the geolocation results are provided the network service provider, either directly by the server or through the mechanism on the client device.

DETAILED DESCRIPTION

The geolocation engine of the present invention is a highly secure and versatile service that allows providers, such as a provider of network gaming services, to securely and reliably determine user or player location, often to within a few meters of accuracy.

The present invention provides a secure method for determining a geolocation using an algorithm within a secure wrapper. The algorithm assesses multiple single sources of geolocation data to derive a more reliable calculation of a digital user's location. The present technology can be "wrapped" in a secure download to a digital device to make it harder to "spoof". Such a "wrapper" consists of such techniques as a program to "sniff" out attempts to mask a digital user's location through such methods as "screen sharing" or use of "proxy servers". A parallel deployment of the solution can also be deployed using the browser of the user, such as for example where a download to the user's PC/Mac/Mobile device is not desirable.

Embodiments of the present invention may be used in several scenarios. For example, registration with a gaming service may occur on operator's website and a client is downloaded. The customer is verified and allowed or not allowed to install the ecommerce application. In another embodiment, an operator asks a customer to agree to terms and conditions of gaming service and downloads a client during registration. After successful verification, a user registers within a client and continues to download and install ecommerce application. In another embodiment, an operator asks a customer to agree gaming service terms and conditions and downloads a client prior to registration. After successful verification, the customer is directed to a unique page on the operators website where he can register and continue to download the ecommerce application.

Figure 1:
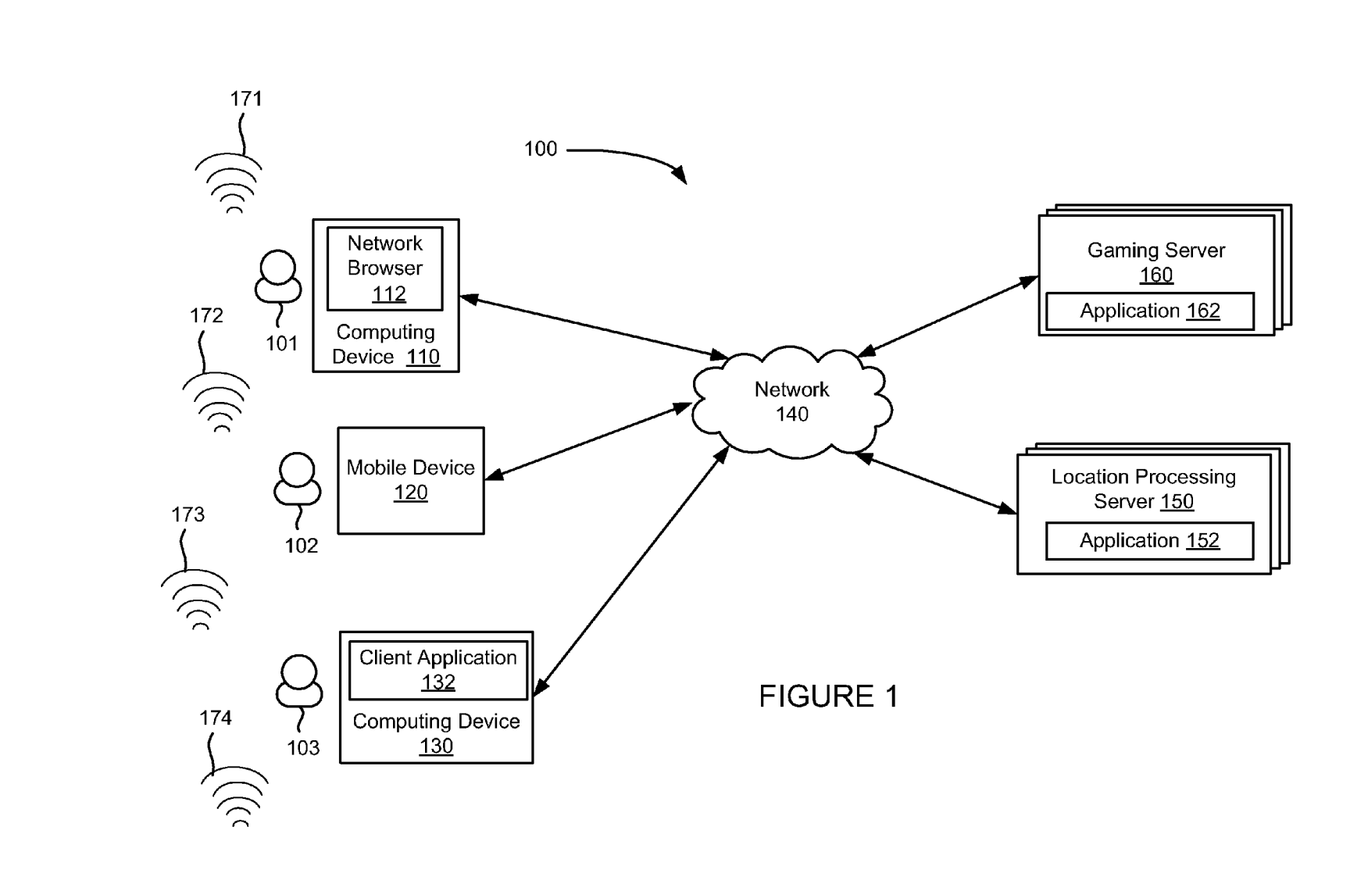
FIG. 1 is a block diagram of an exemplary system for determining a geolocation of a user device.

FIG. 1 is a block diagram of a system 100 for determining a geolocation of a user device. The system 100 includes computing device 110 and 130, mobile device 120, network 140, gaming server 160, and location processing server 150, users 101, 102 and 103, and WiFi points 171, 172, 173 and 174. Client computing devices 110 and 130, mobile device 120 and servers 160 and 150 may communicate with each other over network 140. Network 140 may include one or more private networks, public networks, WLANs, LANs, WANs, the Internet, an intranet, data networks, POTS network, cellular networks, Wi-Fi networks, and/or a combination of these networks.

In some embodiments, a user at one of devices 110, 120 or 130 may access a service provided by gaming server 160 via an application on the device. Computing device 110 includes a network browser. Network browser 112 may be used to implement a web browser for browsing websites provided by network providers, such as the provider of gaming server 160. In some embodiments, a plug-in may be installed into a network browser 112 by location processing server 150 or gaming server 160 for detecting and collecting geolocation data, and transmitting the data over network 140, as well as perform other processing and communication. Computing device 130 may include client application 132. Client application 132 may be installed onto computing device, for example via download from server 160 or 150 over network 140, and perform other processing and communication. Once installed, client application 132 may detect and collect geolocation data, and transmit the data over network 140. Mobile device 120 may include an application or "app." The app may be retrieved for the type of device and operating system associated with mobile device 120. When executed, the mobile device app detect and collect geolocation data, and transmit the data over network 140, and perform other processing and communication.

Gaming server 160 may be implemented as one or more servers, virtual machines, data stores, and other devices, and may include gaming application 162. Gaming application 162 may implement a gaming service provided over network 140, such as for example a web-based gaming service.

Location processing server 150 may be implemented as one or more servers, virtual machines, data stores, and other devices, and may include location processing application 152. location processing application 152 may communicate with gaming application 162 and devices 110-130 to determine the geolocation of any of the devices. The location processing application 152 may communicate with a network browser plug-in, a client application, a mobile app, and other hardware and/or software stored on devices 110-130 to collect geolocation data and communicate with the devices.

Figure 2:
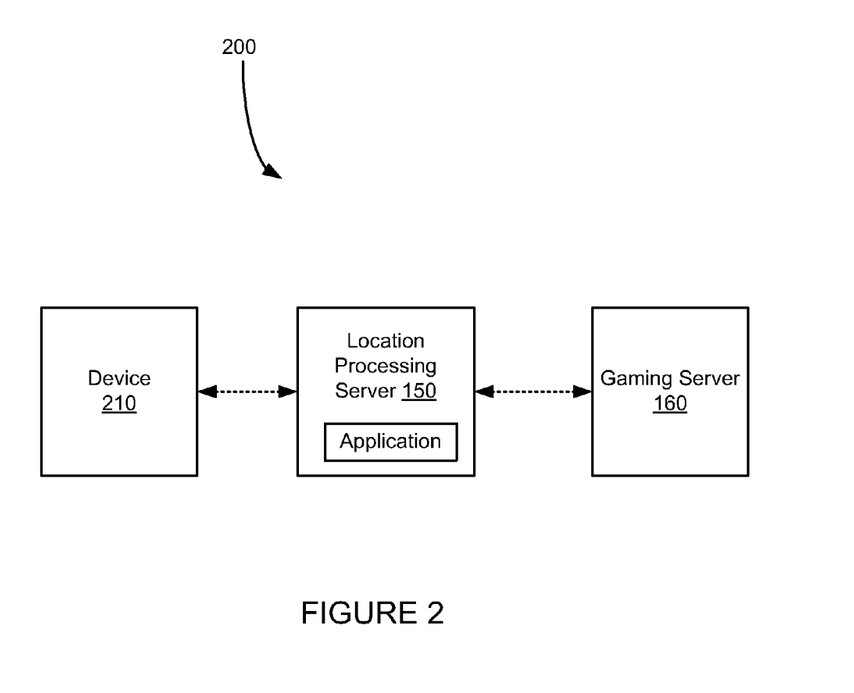
FIG. 2 is a block diagram of a logical relationship between devices of the system of FIG. 1.

FIG. 2 is a block diagram of a logical relationship between devices of the system of FIG. 1. The logical relationship includes location processing server 150 including an application and located in-between device 210 and gaming server 160. Gaming server 160 communicates with device 210 through location processing server's application. Hence, the location processing server 150 may act as a buffer or wrapper to the network service provided by the gaming server 160.

Figure 3:
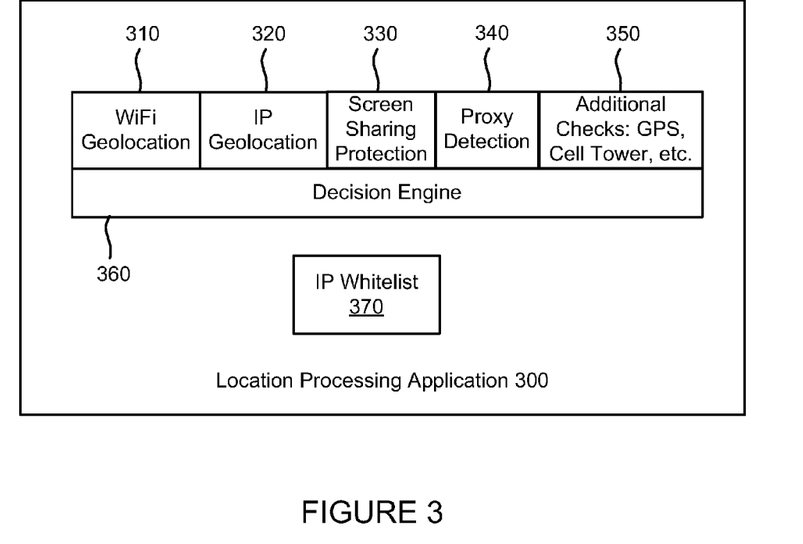
FIG. 3 is a block diagram of modules within a location processing application.

FIG. 3 is a block diagram of modules within a location processing application 300. The modules of application 300 include a WiFi geolocation module 310, IP geolocation module 320, screen sharing protection module 330, proxy detection module 340, and additional checks module 350. Application 300 also includes decision engine 360 and IP whitelist 370. Each of modules 310-360 may be stored in memory on a sever such as location processing server 150 and executed by a processor.

WiFi geolocation module 310 may process Wi-Fi geolocation data collected from one of devices 110-130. The WiFi data may include data from one or more Wi-Fi networks in range of the particular device, and may include location, strength, name, and other data. The Wi-Fi data may be used to determine a location of the particular device.

IP geolocation module 320 may process geolocation data collected from the IP address of the computing device or the device's connection to the Internet. The IP geo data may include name, network parameters such as network address, and other IP data for the network or device.

Screen sharing protection module 330 may determine if the device includes a screen sharing program. If a screen sharing program is detected, Screen sharing protection module 330 may block the program or otherwise communicate its presence as part of the overall decision on allowing the device to access a service provided by gaming server 160.

Proxy detection module 340 may determine if the device is includes a proxy program. If a proxy program is detected on the device, proxy detection module 340 may block the proxy or otherwise communicate its presence as part of the overall decision on allowing the device to access a service provided by gaming server 160.

Additional checks module 350 may check of additional unwanted software, settings or conditions at the device attempting to access gaming application 162. For example, module 350 may check cell tower parameters, GPS parameters, and other data.

Decision engine 360 may make a decision as to whether the device is within an geolocation or there is an issue with the purported geolocation. Geolocation may communicate with each of modules 310-350 (which may also communicate with each other) in determining its decision. Once a decision is made, application 300 may provide the decision directly or indirectly to gaming server 160. Processing geolocation data is discussed in more detail below with respect to the method of FIG. 5.

Whitelist 370 includes a list of devices that have passed geoconferencing requirements. In embodiments, the devices included in whitelist 370 have locations which are also within a desired geoarea or geofence. In some embodiments, application 300 may maintain a blacklist or other list which includes a list of devices associated with a different status than a known and required location, such as a list of devices in a known bad location, a list of devices on a block list, and so forth.

Figure 4:
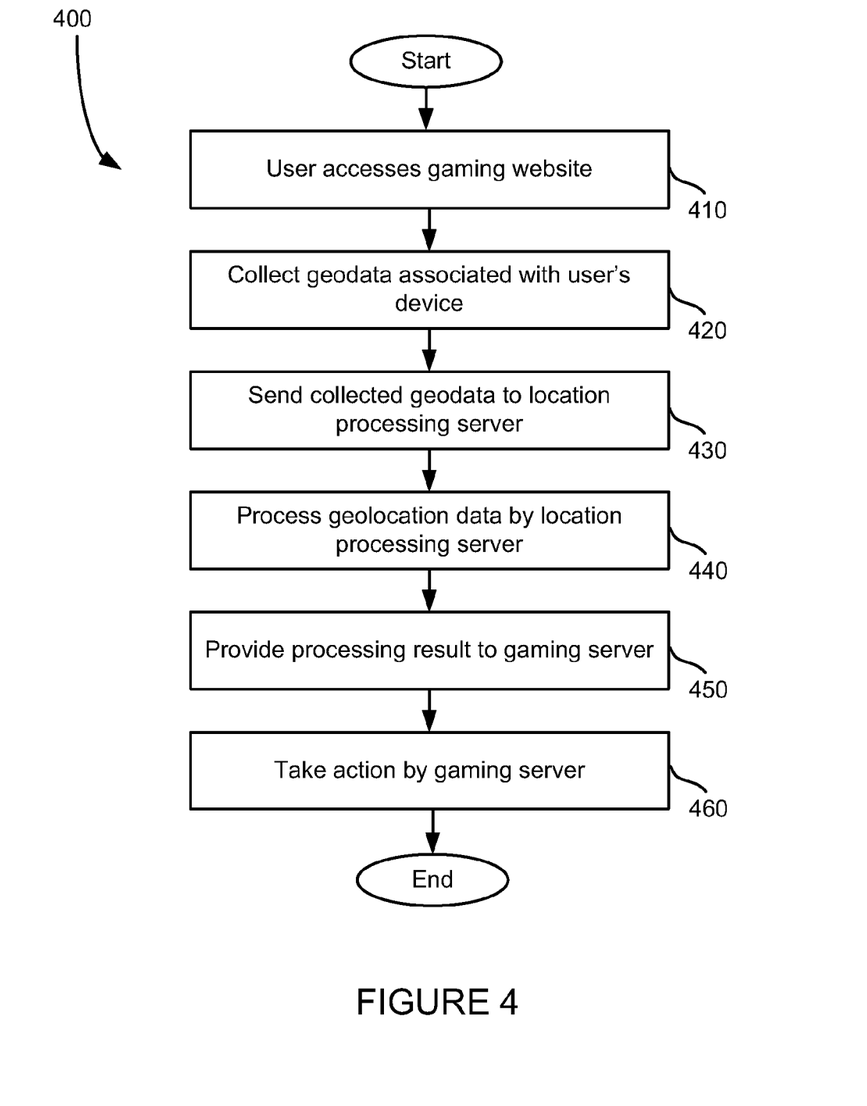
FIG. 4 is a method for determining a geolocation of a user device.

FIG. 4 is a method for determining a geolocation of a user device. The method of FIG. 4 may be performed by one or more devices, servers and machines of FIG. 1. First, a user may access a gaming website at step 410. The gaming website may be provided by gaming application 162 of gaming server 160. The user may access the website via computing devices 110 or 130 or mobile device 120.

Geolocation data for the user's device may be collected at step 420. To collect the data, the device from which the user is operating from would typically provide a request or permission to provide the data to the gaming service. A mechanism for collecting the data would be enabled, and geolocation data would be collected for the device.

Location processing application 152 may request or configure geolocation data collection to for the player at specific interaction points with the gaming system. These interaction points may be configured based on the requirements of the gaming provider (ie, provider of gaming server 160). The geolocation process can be repeated numerous times during the same session to ensure the user does not enter a disallowed region after their first permitted connection.

The mechanism for collecting the data may include a client application, mobile application, HTML mechanism, or browser plug-in. In each case, the collected geolocation data may then be transmitted back to location processing engine 152.

For a client application on a computing device, a user attempting to use the gaming service provided by gaming server 160 may be prompted to download a client application. The client application may be a stand-alone application or part of a larger program. Upon the user providing input to download the client application, the client application is downloaded and installed on user's computing device.

The client application may be executed and may provide the gaming service website, or another interface, provided by gaming server 160 through the client application on the computing device. By providing the website or other interface through the client application, the present technology provides the gaming service through a wrapper which helps prevent unauthorized use of the web-based service (ie, use from a user in a non-desired geographical location).

The installed client application may be instructed by the location processing application 152 to collect various types of geo data. The data may include, but is not limited to, computer MAC address, WiFi access point data, the IP address of the computing device, screen sharing software data, proxy software data, and other data. The collected data may then be transmitted by the client application to location processing engine 152.

A mobile application for mobile device 120 may operate similarly to client application 132 of computing device 130. In some embodiments, rather than download the client from a location processing server directly, the mobile device may receive the mobile application from a mobile application store. The mobile application store may be provided as network service and may depend on the type of device and/or operating system of the mobile device.

In some embodiments, the present technology may use HTML 5 to collect and transmit geolocation data. For devices using HTML 5, a location library may be used to request a user to accept sharing of data, receive the user acceptance, retrieve the data and transmit the data to location processing application 152.

A network browser plug-in may be used to collect and transmit geolocation data. The gaming service website provided to a user may request the user to install a network browser plug-in. Upon the user's acceptance, the plug-in may be provided by location processing server 150 to the user's device for installation to network browser 112. The installed browser plug-in may then retrieve geolocation data and transmit the data to location processing application 152.

Returning to FIG. 4, the collected geolocation data is transmitted to location processing server 150 at step 430. As discussed herein, the data may be transmitted by one of several mechanisms, such as a client application, mobile app, a mechanism within HTML 5, and a network browser plug-in.

The geolocation data is processed by location processing server 150 at step 440. Processing the data may include comparing the data to parameters set forth by gaming server 160, determining if the determined geolocation data is accurate and trusted, and other calculations. Processing the geolocation data may include setting the device geolocation as "pass" or "fail" for. Processing geolocation data is discussed in more detail below with respect to the method of FIG. 5.

The result of the geolocation data is provided to the gaming server at step 450. In some embodiments, the geolocation data result is transmitted directly to the gaming server by location processing server. In some embodiments, the result is provided to one of the client application, mobile application, browser plug-in or other mechanism or module on the device associated with the user and then provided to the gaming service by the particular module or mechanism.

The gaming server 160 may take action on the result at step 460. In the case of a "pass" result, the gaming server may provide the gaming service to the user associated with the device. When the result is a "fail", the gaming server may deny service to the device.

In some embodiments, when a geolocation result indicates a "fail" for the device, the gaming application 162 may have location processing engine perform a second determination to confirm the geo-location of the user. For example, if a geolocation based on IP of the user's device provides a "fail" result, the geolocation may be determined based on a web-plugin or other methodology described herein.

Figure 5:
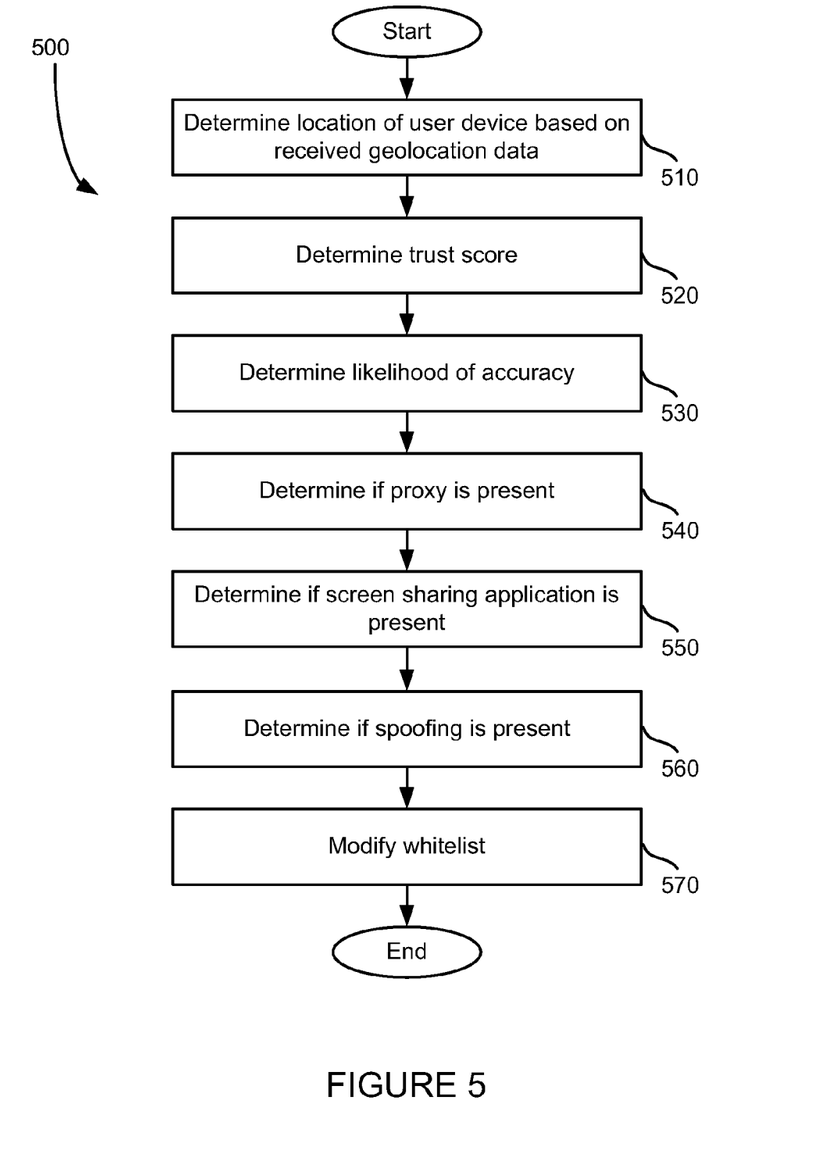
FIG. 5 is a method for processing geolocation data by a location processing application

FIG. 5 is a method for processing geolocation data by a location processing application. The method of FIG. 5 may provide more detail for step 440 of the method of FIG. 4. First, a location for the user device is determined based on received geolocation data at step 510. Location processing application 152 gathers as much information as possible about the player's computer & location that is appropriate to security. This may include the computers MAC address, any WiFi access points 171-174 in range of the users device, the IP address of users device, screen sharing software (such as GoToMyPC, VNC, Adobe Connect, LogMeIn), and proxy software of computing device 140.

The present system may use raw geolocation data from third parties and perform numerous calculations to compare the different datasets. A new calculation may be created upon which to base a more reliable geolocation conclusion. This includes calculations such as the great-circle distance between two pairs of location coordinates, polygon point inclusion for determining whether user is in location or not, a difference engine that compares the different datasets to find anomalies, and other smaller methods that compare the data against a users configuration requirements.

Information for determining location may be retrieved from several sources. For example, WiFi data may be received from Skyhook Wireless and IP Database information may be retrieved from MaxMind, Inc. In the future other sources are envisioned for use in the algorithm, such as GPS transmitters, Biometrics like finger print and/or face reading software, and so forth.

In some embodiments, a user's indoor location may be determined from geolocation data received as device data. Signal data such as WiFi, Bluetooth, and other data may be collected by the mechanism on the device. For example, the device may scan for available WiFi sources and present any detected sources back to the location processing server for triangulation. For device data processing, data processing may be done on the device, and so the network may effectively be 'dumb'. Additional access points to increase the range and/or accuracy of the geolocation calculations can be added without needing to be attached to the network. To collect device data for determining indoor geolocation, the present system may utilize software modules executable to scan WiFi access points, obtain SSID, SSI and MAC data and perform trilateration on the data, Send a RESTful XML to a server, provide callbacks for pass and fail, access floor plan and access point location information, and manage geofence information. The present system may also use WiFi and Bluetooth signal 'fingerprinting' which may take a snapshot of the RF fields within a particular area to determine the location of a user with respect to pre-determined and known RF transmitters.

In some embodiments, a user's indoor location may be determined from geolocation data received as network data, wherein the network scans for devices and provides the device data to location processing server. As the network scans for devices, any device can be catered for, from laptops, through to phones, tablets and anything that communicates via WiFi. Further, applications on a mobile device such as a smart phone only need internet access to retrieve a device pass/fail information. Hence, the device may be effectively 'dumb'. As internet access is the only prerequisite, a larger number of platforms may be supported then a device-based geolocation data method discussed above, such as Blackberry, iOS, Android, as well as Symbian and Windows Phone. To collect device data for determining indoor geolocation, the present system may utilize software modules executable to monitor nearby devices, capture signal strength, perform trilateration, manage geofence data, and other functions.

A trust score may be determined for the user device geolocation at step 520. A likelihood of accuracy may be determined for the user device geolocation at step 530. The present technology may consider each source of information, and the number of sources of information, and provide a weighting to each source (or absence of information) to determine a score related to the likelihood of a particular geolocation of the user. The trust score and likelihood of accuracy may be determined methods known in the art.

Location processing application 152 may also determine if a proxy is present at step 540 and if a screen sharing application is present on the client device at step 550. Detections of proxy and screen sharing programs may trigger security actions, such as program blocking or other actions, as specified by the gaming provider. A determination is also made if spoofing is present at step 560.

Location processing application 152 determines if the user device should be added to a whitelist at step 570. The decision may be based on the geolocation determined from the received data, the trust score and likelihood of accuracy, and whether any of a proxy, screen sharing application or spoofing is present. For example, the location processing application may make a determination for one or more parameters of device inclusion/exclusion, boundary configuration, Wifi accuracy, GPS accuracy, GSM accuracy, IP accuracy, IP+WiFi distance, proxy detection, software detection (screen sharing, and others), user type, and remote desktop detection. Each parameter may be determined to have a binary value (pass/fail) or a numerical value within a range. The gaming provider may configure a rule to add a user device to a white list based on the parameter values. For example, a user device may be added to the list if 80% of the parameters "pass", but an automatic no-whitelist add if the device is on an exclusion list or proxy, software or remote desktop is detected. In some embodiments, some of the parameters may be weighted so that they are considered more important than others.

The whitelist can be accessed via a web API call to location processing application 152 from gaming server 160. The information returned may be a simple yes or no, as the application 152 will have already dealt with making a decision on the device's location. The code required on the gaming server may be as simple as possible to allow quick and easy integration into a number of different web programming languages. In pseudo code, this can be as simple as:

```
if (Application.IsAuthorized(ip_address) == "yes")
    <allow access to games>
else
    <send to geolocation client download page>
```

With a straightforward, cross-platform API, implementation of the present system is quick and easy. The present provider of the location processing engine may support and assist in all stages, from design of a downloadable client application (or integration into a client), to providing support and training in using the back-end to configure location preferences and training manuals in supporting customers who may need help in geolocating. By taking away all concern with the location aspect of the service, the gaming provider is free to concentrate on delivering the best service to the customer while the location processing engine service can focus on the security of the geolocation service.

The geolocation processing system of the present invention may have several benefits. The system may have unmatched accuracy as it determines a player location within meters. The system may use multiple positioning technologies to increase reliability of results across diverse topologies. The system may use a sophisticated rules based algorithm to deliver intelligent weighting to results. It may be easily integrated into gaming applications and services through use of a very simple application program interface (API). It may be highly configurable, and may have location & security parameters which can be configured. The system may provide high capacity, real-time processing and perform automated data updates with zero downtime. The system may have multiple integration options, be highly scalable and fault tolerant.

Figure 6:
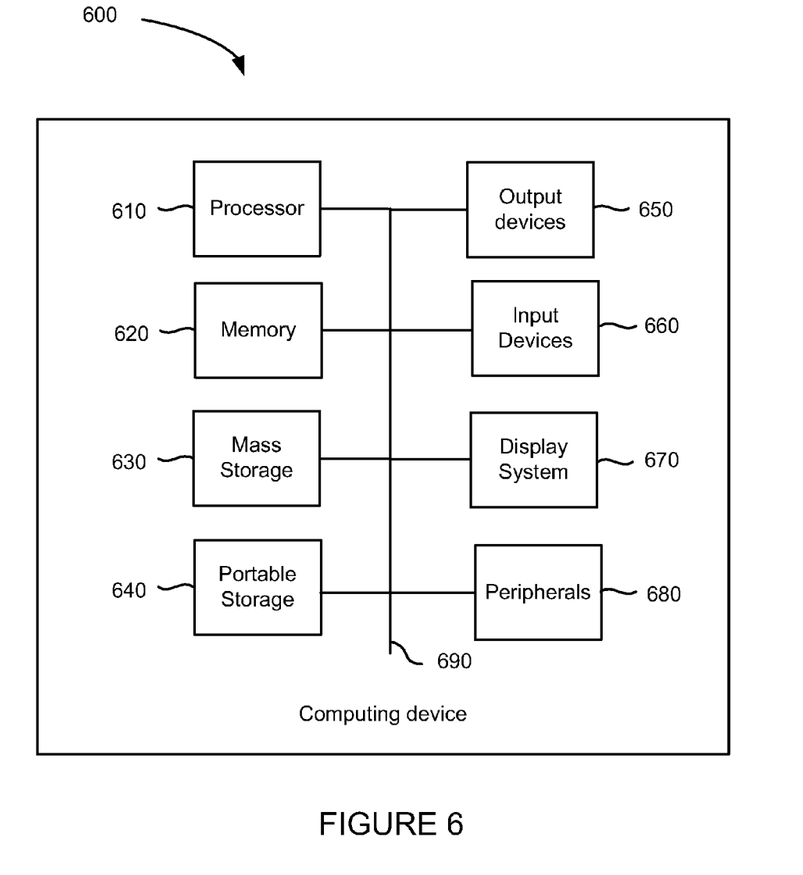
FIG. 6 is a block diagram of an exemplary system for implementing a computing device.

FIG. 6 is a block diagram of an exemplary system for implementing a computing device. System 600 of FIG. 6 may be implemented in the contexts of the likes of computing devices 110 and 130, gaming server 160, and location processing server 150. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 7:
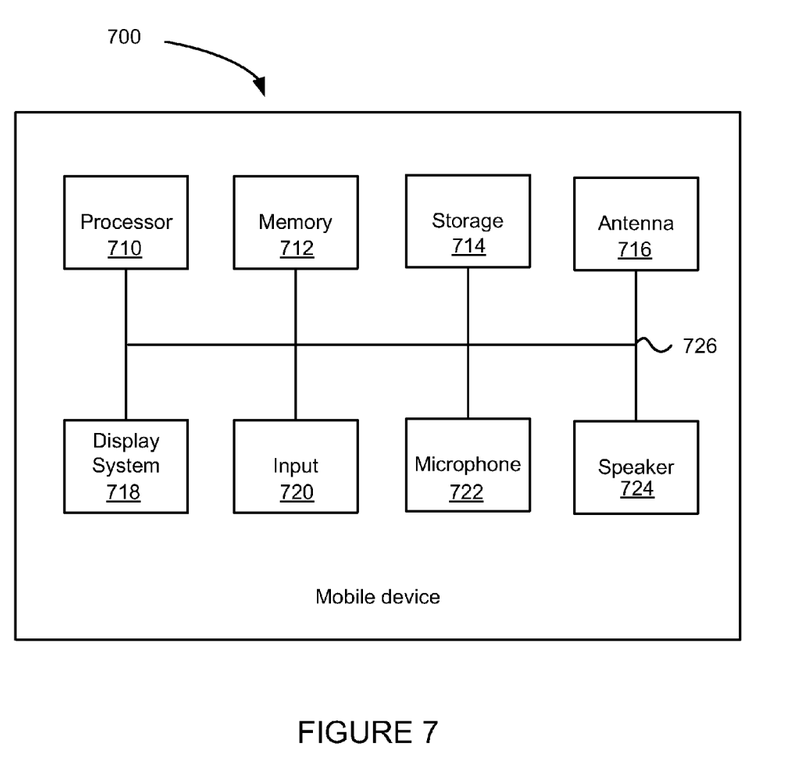
FIG. 7 is a block diagram of an exemplary system for implementing a mobile device.

FIG. 7 is a block diagram of an exemplary system for implementing a mobile device, such as for mobile device 120. The system (i.e., mobile device) 700 of FIG. 7 includes one or more processors 710 and memory 712. Memory 712 stores, in part, programs, instructions and data for execution and processing by processor 710. The system 700 of FIG. 7 further includes storage 714, one or more antennas 716, a display system 718, inputs 720, one or more microphones 722, and one or more speakers 724.

The components shown in FIG. 7 are depicted as being connected via a single bus 726. However, the components 710-724 may be connected through one or more data transport means. For example, processor unit 710 and main memory 712 may be connected via a local microprocessor bus, and storage 714, display system 718, input 720, and microphone 722 and speaker 724 may be connected via one or more input/output (I/O) buses.

Memory 712 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 712 can store the system software for implementing embodiments of the present invention for purposes of loading that software into main memory 710.

Antenna 716 may include one or more antennas for communicating wirelessly with another device. Antenna 716 may be used, for example, to communicate wirelessly via Wi-Fi, Bluetooth, with a cellular network, or with other wireless protocols and systems. The one or more antennas may be controlled by a processor 710, which may include a controller, to transmit and receive wireless signals. For example, processor 710 execute programs stored in memory 712 to control antenna 716 transmit a wireless signal to a cellular network and receive a wireless signal from a cellular network.

Display system 718 may include a liquid crystal display (LCD), a touch screen display, or other suitable display device. Display system 770 may be controlled to display textual and graphical information and output to text and graphics through a display device. When implemented with a touch screen display, the display system may receive input and transmit the input to processor 710 and memory 712.

Input devices 720 provide a portion of a user interface. Input devices 760 may include an alpha-numeric keypad, such as a keyboard, for inputting alpha-numeric and other information, buttons or switches, a trackball, stylus, or cursor direction keys.

Microphone 722 may include one or more microphone devices which transmit captured acoustic signals to processor 710 and memory 712. The acoustic signals may be processed to transmit over a network via antenna 716.

Speaker 724 may provide an audio output for mobile device 700. For example, a signal received at antenna 716 may be processed by a program stored in memory 712 and executed by processor 710. The output of the executed program may be provided to speaker 724 which provides audio. Additionally, processor 710 may generate an audio signal, for example an audible alert, and output the audible alert through speaker 724.

The mobile device system 700 as shown in FIG. 7 may include devices and components in addition to those illustrated in FIG. 7. For example, mobile device system 700 may include an additional network interface such as a universal serial bus (USB) port.

The components contained in the computer system 700 of FIG. 7 are those typically found in mobile device systems that may be suitable for use with embodiments of the present invention and are intended to represent a broad category of such mobile device components that are well known in the art. Thus, the computer system 700 of FIG. 7 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for determining a geo-location, the method comprising:
   transmitting a request to a first server by a first device;
   collecting geolocation data associated with the first device in response to the request, the geolocation data collected by a module stored in memory and executed by a processor on the first device, the first device in communication with the first server which provides a service over a network;
   identifying that one or more selected programs are present at the first device;
   transmitting the geolocation data and programs and a list of the present selected programs to a second server;
   receiving a geolocation message from the second server, the geolocation message generated at least in part from the geolocation data and a list of the present selected programs; and
   providing the received geolocation message to the first server.

2. The method of claim 1, wherein the first device is a mobile device and the geolocation data collected by the module is a mobile application installed on the mobile device.

3. The method of claim 1, wherein the geolocation data collected by the module is a network browser plug-in installed on a network browser on the first device.

4. The method of claim 1, wherein collecting includes determining geolocation data for one or more remote devices in the proximity of the first device based on communication with the one or more remote devices and the first device.

5. The method of claim 1, wherein collecting data includes collecting device data from the network at the location of the first device.

6. The method of claim 1, wherein collecting data includes collecting building information from within the building by the first device.

7. The method of claim 1, wherein the programs include a proxy application.

8. The method of claim 1, wherein the programs include a screen sharing program.

9. The method of claim 1, wherein the geolocation message is in the form of a binary message indicating a pass or fail of the first device regarding a geolocation requirement.

10. A non-transitory computer readable storage medium having embodied thereon a program, the program being executable by a processor to perform a method for determining a geo-location, the method comprising:
    transmitting a request to a first server by a first device;
    collecting geolocation data associated with the first device in response to the request, the geolocation data collected by a module stored in memory and executed by a processor on the first device, the first device in communication with the first server which provides a service over a network;

identifying whether one or more selected programs are present at the first device;
transmitting the geolocation data and programs and a list of the present selected programs to a second server;
receiving a geolocation message from the second server, the geolocation message generated at least in part from the geolocation data and a list of the present selected programs; and
providing the received geolocation message to the first server.

* * * * *